US012807808B2

(12) United States Patent
Lugger et al.

(10) Patent No.: US 12,807,808 B2
(45) Date of Patent: Nov. 24, 2026

(54) COLORABLE WEATHERABLE ELECTRICALLY CONDUCTIVE POLYCARBONATE BLEND COMPOSITIONS

(71) Applicant: SHPP GLOBAL TECHNOLOGIES B.V., Bergen op Zoom (NL)

(72) Inventors: Jody Ann Martin Lugger, Bergen op Zoom (NL); Sascha Jan Ter Horst, Bergen op Zoom (NL); Mark Adrianus Johannes Van Der Mee, Bergen op Zoom (NL)

(73) Assignee: SHPP Global Technologies B.V., Bergen op Zoom (NL)

( * ) Notice: Subject to any disclaimer, the term of this patent is extended or adjusted under 35 U.S.C. 154(b) by 273 days.

(21) Appl. No.: 18/266,144

(22) PCT Filed: Dec. 13, 2021

(86) PCT No.: PCT/IB2021/061651
§ 371 (c)(1),
(2) Date: Jun. 8, 2023

(87) PCT Pub. No.: WO2022/130177
PCT Pub. Date: Jun. 23, 2022

(65) Prior Publication Data

US 2024/0052159 A1 Feb. 15, 2024

(30) Foreign Application Priority Data

Dec. 14, 2020 (EP) .................................... 20213784

(51) Int. Cl.
*C08L 69/00* (2006.01)

(52) U.S. Cl.
CPC .................................. *C08L 69/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,018,567 | B2 | 3/2006 | Murray | |
| 8,993,671 | B2 | 3/2015 | Juikar et al. | |
| 9,260,602 | B2 | 2/2016 | Uchiyama | |
| 2004/0122168 | A1 | 6/2004 | Murray | |
| 2011/0060106 | A1 | 3/2011 | de Kraker et al. | |
| 2013/0196131 | A1 | 8/2013 | Malinowski et al. | |
| 2017/0158853 | A1 * | 6/2017 | Grieshaber | C08L 69/00 |
| 2018/0215894 | A1 | 8/2018 | Cheng et al. | |
| 2019/0169429 | A1 | 6/2019 | Moniruzzaman et al. | |
| 2019/0309205 | A1 * | 10/2019 | Guo | C09K 5/14 |

FOREIGN PATENT DOCUMENTS

| | | | | |
|---|---|---|---|---|
| CA | 2306336 | C | 4/2006 | |
| EP | 3845602 | A1 * | 7/2021 | C08L 69/00 |
| WO | 2008/042500 | A1 | 4/2008 | |
| WO | 2010/076680 | A1 | 7/2010 | |
| WO | 2012/145465 | A1 | 10/2012 | |
| WO | 2016/174592 | A1 | 11/2016 | |

OTHER PUBLICATIONS

International Search Report and Written Opinion mailed Jan. 12, 2022 in PCT/IB2021/061651 (12 pgs.).

* cited by examiner

*Primary Examiner* — Randy P Gulakowski
*Assistant Examiner* — Audra J Destefano
(74) *Attorney, Agent, or Firm* — Quicker Law, LLC

(57) ABSTRACT

A thermoplastic composition includes: (a) from about 5 wt % to about 90 wt % of an aliphatic polyester-polycarbonate copolymer, (b) from about 5 wt % to about 65 wt % of a polycarbonate component different from the aliphatic polyester-polycarbonate copolymer in element (a); and (c) from greater than 5 wt % to about 30 wt % of an inherently dissipative polymer (IDP). The composition has a heat distortion temperature of at least 90° C. at 1.8 MPa and 4.0 mm as determined in accordance with ISO 75 and a notched Izod impact strength at 23° C. of at least 25 kJ/$m^2$ as tested in accordance with ISO 180 at a thickness of 4.0 mm. In further aspects the composition has improved surface gloss properties as compared to a comparative composition that does not include the aliphatic polyester-polycarbonate copolymer of element (a).

7 Claims, No Drawings

COLORABLE WEATHERABLE ELECTRICALLY CONDUCTIVE POLYCARBONATE BLEND COMPOSITIONS

CROSS-REFERENCE TO RELATED APPLICATION

This application is the National Stage of International Application No. PCT/IB2021/061651 filed Dec. 13, 2021, which claims priority to and the benefit of European Application No. 20213784.0 filed Dec. 14, 2020, the disclosures of which are incorporated herein by this reference in their entireties.

FIELD OF THE DISCLOSURE

The present disclosure relates to polycarbonate (PC) compositions having good electrostatic discharge (ESD) properties, and in particular PC compositions that include an inherently dissipative polymer (IDP).

BACKGROUND OF THE DISCLOSURE

For certain industrial lighting and other applications there is need to satisfy ATEX ("Appareils destinéà être utilisés en ATmosphères Explosives") regulations; particularly in the European Union. ATEX standards require materials to have an electrostatic discharge (ESD) in the E-9 to E-11 range, or alternatively to have an appropriate static decay. For lighting applications, other requirements exist relating to impact, heat, weatherability, and heat ageing properties. Colorable ESD polymer grades exist, but these polymers typically have a low initial impact, a low impact at sub-zero temperatures, poor impact retention after hydro aging/thermal endurance testing, and/or a low heat (heat distortion temperature (HDT)/Vicat softening temperature). Boosting the impact performance may be accomplished by adding polycarbonate (PC) resins. Unfortunately, however, such compositions have high processing temperature and a poor surface finish due to skin-formation of the anti-static agent (IDP) that is used within the formulation.

These and other shortcomings are addressed by aspects of the present disclosure.

SUMMARY

Aspects of the disclosure relate to thermoplastic compositions including: from about 5 wt % to about 90 wt % A of an aliphatic polyester-polycarbonate copolymer; from about 5 wt % to about 65 wt % of a polycarbonate component different from the aliphatic polyester-polycarbonate copolymer in element (a); and from greater than 5 wt % to about 30 wt % of an inherently dissipative polymer (IDP). The composition has a heat distortion temperature of at least 90° C. at 1.8 MPa and 4.0 mm as determined in accordance with ISO 75 and a notched Izod impact strength at 23° C. of at least 25 km as tested in accordance with ISO 180 at a thickness of 4.0 mm. The combined weight percent value of all components does not exceed 100 wt %, and all weight percent values are based on the total weight of the composition.

DETAILED DESCRIPTION

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless, specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

Reference in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "$M_w$" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

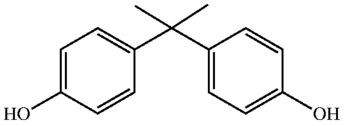 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise-stated to the contrary herein, all test standards are the most recent standard in effect it the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Polycarbonate (PC) is a desirable polymer for ESD applications because it is colorable, offers a high impact resistance and typically a high resistance to impact retention after exposure to long term use conditions like heat, moisture and/or UV light. Unfortunately, the IDPs typically used to make compounds for ESD applications cannot withstand the processing temperatures of standard polycarbonate resins resulting in (1) lowered efficacy in terms of surface resistivity, due to degradation of the IDP or (2) due to a rheological mismatch with the polycarbonate they form a skin-layer which delaminates easily. Technologies have been developed to lower the processing temperature of PC resin matrix using high flow PC copolymers as blend component, while retaining PCs excellent thermal endurance properties, surface resistivity, and an esthetically pleasing surface finish without delamination of the IDP.

High flow PC copolymers, such as HFD resin from SABIC, is a highly suitable PC copolymer with respect to flow and ductility, but has a lowered heat and thermal endurance compared to standard PC, and does not perform as well compared to other PC copolymers (e.g., polycarbonate-siloxane (PC-Si) copolymers) in terms of low temperature impact. This requires an optimization of blend composition to match the resin matrix rheological properties to the IDP to improve surface finish, while balancing the PC-Si copolymer content in the composition to retain sufficient impact and thermal endurance.

By using a PC-Si copolymer to increase low temperature impact strength of PC, the tendency of the formulations to end up with a poor surface finish increases. Further improvements can be made by creating unique blends using PC-Si copolymer to provide a composition with better impact strength at room temperature and sub-zero temperatures, excellent impact retention, and a good surface finish without delamination of the IDP compared to conventional blends. Optimization of the components in the composition results in a PC matrix which together with the IDP has sufficient heat, a high impact and excellent surface finish. In case higher heat resistance is needed, the addition of a high heat PC copolymer that is miscible with the PC/HFD matrix to boost the HDT can be considered.

Aspects of the disclosure relate to a thermoplastic composition including: (a) from about 5 wt % to about 90 wt % of an aliphatic polyester-polycarbonate copolymer, (b) from about 5 wt % to about 65 wt % of a polycarbonate component different from the aliphatic polyester-polycarbonate copolymer in element (a); and (c) from greater than 5 wt % to about 30 wt % of an inherently dissipative polymer (IDP). The composition has a heat distortion temperature of at least 90'° C. at 1.8 megapascals (MPa) and 4.0 millimeter (mm) as determined in accordance with ISO 75 and a notched Izod impact strength at 23° C. of at least 25 kilojoules per square meter (kJ/$m^2$) as tested in accordance with ISO 180 at a thickness of 4.0 mm. The combined weight percent value of all components does not exceed 100 wt. %, and all weight percent values are based on the total weight of the composition.

The aliphatic polyester-polycarbonate copolymer may be derived from a linear $C_{6-20}$ aliphatic dicarboxylic acid (which includes a reactive derivative thereof), specifically a linear $C_{6-12}$ aliphatic dicarboxylic acid (which includes a reactive derivative thereof). Specific dicarboxylic acids include n-hexanedioic acid (adipic acid), n-demayedioic acid (sebacic acid), and alpha, omega-$C_{12}$ dicarboxylic acids such as dodemayedioic acid (DDDA). A specific poly(aliphatic ester)-polycarbonate has the formula:

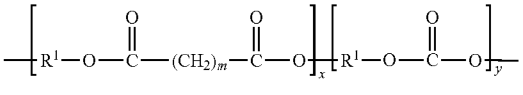

wherein each $R^1$ may be the same or different, and is as described in formula (1), m is 4 to 18, preferably 4 to 10, and the average molar ratio of ester units to carbonate units x:y is 99:1 to 1:99, including 13:87 to 2:98, or 9:91 to 2:98, or 8:92 to 2:98. In a specific aspect, the aliphatic polyester-polycarbonate copolymer comprises bisphenol A-sebacate ester units and bisphenol A carbonate units, having, for example an average molar ratio of x:y of 2:98 to 8:92, for example 6:94. Such poly(aliphatic ester-carbonate)s are commercially available as LEXAN™ HFD resin from SABIC (LEXAN is a trademark of SABIC). The high flow ductile (HFD) copolymer may have a low molecular weight of 21 k Mw and a sebacic acid content at 6.0 mol % sebacic acid. HFD may have a high molecular weight at 36.5 k Mw and a sebacic acid content at 8.5 mol %.

The poly(aliphatic ester-carbonate) may have a weight average molecular weight of 15,000 to 40,000 g/mol, including 20,000 to 38,000 g/mol (measured by GPC based on BPA polycarbonate standards). In some aspects, the poly (aliphatic ester-carbonate) includes a poly(aliphatic ester-carbonate) having a weight average molecular weight from 18,000-30,000 g/mol, preferably 20,000-25,000 g/mol; a poly(aliphatic ester-carbonate) having a weight average molecular weight from 30,000-40,000 g/mol, preferably 35,000-40,000 g/mol; or a combination thereof, each as measured via gel permeation chromatography using bisphenol A homopolycarbonate standards.

In certain aspects the polycarbonate component in element (b) is a polycarbonate homopolymer, a polycarbonate copolymer, or a combination thereof.

The term "inherently dissipative polymer" (IDP) refers to several materials that can be either melt-processed into polymeric resins or sprayed onto commercially available polymeric forms and shapes to improve conductive properties and overall physical performance. Typical, monomeric antistatic agents are glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, quaternary ammonium salts, quaternary ammonium resins, imidazoline derivatives, sorbitan esters, ethanolamides, betaines and mixtures of the foregoing.

Typical IDPs include copolyesteramides, polyether-polyamides, polyetheramide block copolymers, polyetheresteramide block copolymers, polyurethanes containing a polyalkylene glycol moiety, polyetheresters and mixtures thereof. Polymeric antistatic materials are desirable since they are typically fairly thermally stable and processable in the melt state in their neat form or in blends with other polymeric resins. The polyetheramides, polyetheresters and polyetheresteramides include block copolymers and grail copolymers both of which are obtained by the reaction between a polyamide-forming compound and/or a polyester-forming compound, and a compound containing a polyalkylene oxide unit. Polyamide forming compounds include aminocarboxylic acids such as ω-aminocaproic acid, ω-aminoenanthic acid, ω-aminocaplylic acid, ω-aminopelargonic acid, ω-aminocapric acid, 1,1-aminoundecanoic acid and 1,2-aminododecanoic acid; lactams such as α-caprolactam and enanthlactam; a salt of a diamine with a dicarboxylic acid, such as hexamethylene diamine adipate, hexamethylene diamine sebacate, and hexamethylene diamine isophthalate; and a mixture of these polyamide-forming compounds. Suitable polyamide-forming compound include caprolactam, 1,2-aminododecanoic acid, or a combination of hexamethylene diamine and adipate. Commercially available IDPs include: Pelestat NC7530 (polyetheresteramide, PEEA) from Sanyo Chemical); IRGASTAT P16, available from CIBA Specialty Chemicals, manufactured by Atofina (Pebax MV1074) RI=1.508); Pelestat NC6321 (Sanyo Chemical sold in the Americas by Tomen); Pelestat 6500 with the same refractive index as Pelestat NC6321, a small molecule with salt or electrolyte added to it to increase its conductivity; Pelectron AS, available from Sanyo Chemical; and U1 and hSTAT2, available from Croda. hSTAT2 is a blend based on a polyether block polymer and a styrene copolymer. In a particular aspect the IDP includes PEEA or a polyether block polymer/styrene copolymer blend (e.g., hSTAT2).

In some aspects the composition further includes a high heat copolymer including polycarbonate. Generally, as used herein, the term or suffix "polycarbonate" means compositions having repeating structural carbonate units of the formula (1):

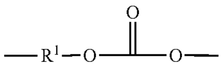

(1)

in which at least 60 percent of the total number of $R^1$ groups are aromatic organic radicals and the balance thereof are aliphatic, alicyclic, or aromatic radicals. In one aspect, each $R^1$ is an aromatic organic radical, for example a radical of the formula (2):

$$A^1\text{-}Y^1\text{-}A^2\text{-} \quad (2)$$

wherein each of $A^1$ and $A^2$ is a monocyclic divalent aryl radical and $Y^1$ is a bridging radical having one or two atoms that separate $A^1$ from $A^2$. In an exemplary aspect, one atom separates $A^1$ from $A^2$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the reaction of dihydroxy compounds having the formula HO—$R^1$—OH, which includes dihydroxy compounds of formula (3):

$$HO\text{-}A^1\text{-}Y^1\text{-}A^2\text{-}OH \quad (3)$$

wherein Y, $A^1$ and $A^2$ are as described above. Also included are bisphenol compounds of general formula (4):

(4)

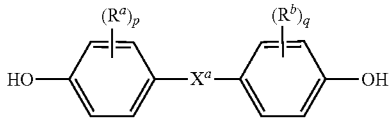

wherein $R^a$ and $R^b$ each represent a halogen atom or a monovalent hydrocarbon group and may be the same or different; p and q are each independently integers of 0 to 4; and X represents one of the groups of formula (5):

(5)

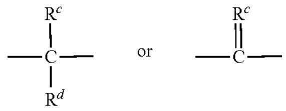

wherein $R^c$ and $R^d$ each independently represent a hydrogen atom or a monovalent linear or cyclic hydrocarbon group and $R^c$ is a divalent hydrocarbon group.

In an aspect, a heteroatom-containing cyclic alkylidene group includes at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

(6)

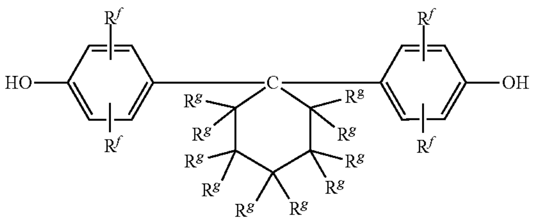

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, pr a combination including at least one of the foregoing with other bisphenol polycarbonates, are supplied by Covestro.

Other useful dihydroxy compounds having the formula HO—$R^1$—OH include aromatic dihydroxy compounds of formula (7):

(7)

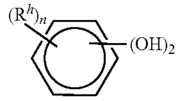

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibeofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations including at least one of the foregoing dihydroxy compounds.

Specific examples of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl) propane, 1,1-bis(4-hydroxy-t-butylphenyl) propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations including at least one of the foregoing dihydroxy compounds may also be used.

In a specific aspect, $X^a$ in formula (4) is a substituted, fused $C_{5-18}$ heterocycloalkylidene. In a specific aspect, a dihydroxyaromatic monomer including the substituted, fused $C_{5-18}$ heterocycloalkylidene is a 2-hydrocarbyl-3,3-bis(4-hydroxyaryl)phthalimidine (also referred to as a 2-hydrocarbyl-3,3-bis(4-hydroxyaryl)-2,3-dihydroisoindol-1-one) of the formula (8):

(8)

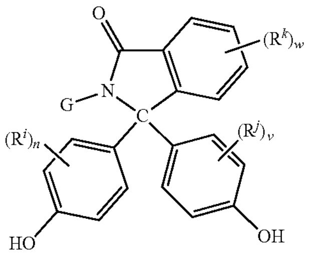

wherein $R^i$, $R^j$, and $R^k$ are independently $C_{1-12}$ hydrocarbyl, G is a $C_{1-12}$alkyl or $C_{6-18}$ aromatic group, and u, v, and w are each independently an integer from 0 to 4. In an exemplary aspect, the dihydroxyaromatic monomer is 2-phenyl-3,3-bis(4-hydroxyphenyl)phthalimidine (PPPBP), having the formula (8a):

(8a)

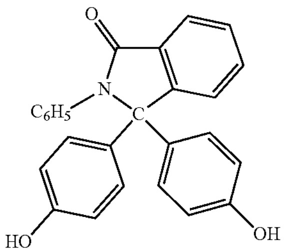

In some aspects composition further includes a polycarbonate-siloxane copolymer that is different from the polycarbonate component in element (b). The polycarbonate-siloxane copolymer includes carbonate units and siloxane units. "Polycarbonate" is as defined above. The siloxane units (also referred to as polysiloxane blocks) are optionally of formula (9)

(9)

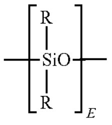

wherein each R is independently a $C_{1-13}$ monovalent organic group. For example, R can be a $C_{1-13}$ alkyl, C—$C_{13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with one or more of fluorine, chlorine, bromine, or iodine. In an aspect, where a transparent poly(carbonate-siloxane) is desired, R is unsubstituted by halogen. A combination of the foregoing R groups can be used in the same poly(carbonate-siloxane).

In an aspect, each R is independently a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylar- (10)

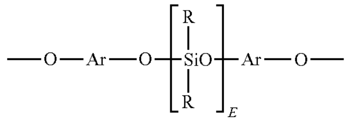

wherein E is as defined for formula (9); each R can be the same or different, and is as defined for formula (9); and Ar can be the same or different, and is a substituted or unsubstituted $C_6$-$C_{30}$ arylene, wherein the bonds are directly connected to an aromatic moiety. Ar groups in formula (10) can be derived from a $C_6$-$C_{30}$ dihydroxyarylene compound, for example a dihydroxy compound such as those described herein. Exemplary dihydroxy compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl)n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane, or a combination thereof.

Specific examples of siloxane units of formula (10) include those of the formulas (11a) and (11b):

(11a)

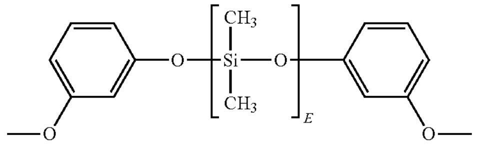

(11b)

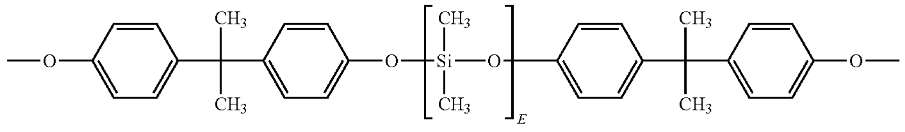

ylene, or $C_7$ alkylarylenoxy. In still another aspect, each R is independently methyl, trifluoromethyl, or phenyl.

The value of E in formula (9) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the polycarbonate-siloxane copolymer. Conversely, where E is of a higher value, e.g., greater than 40, a relatively lower amount of the polycarbonate-siloxane copolymer can be used. A combination of a first and a second (or more) polycarbonate-siloxanes can be used, wherein the average value of E of the first copolymer is less than the average value of E of the second copolymer.

Suitable siloxane units have been described, for example, in WO 2008/042500 A1, WO 2010/076680 A1, and WO 2016/174592 A1. In an aspect, the siloxane units are of formula (10)

wherein E is as described in Formula (9). In an aspect, E has an average value of 10 to 80 or 10 to 40, and in still another aspect, E has an average value of 40 to 80, or 40 to 70.

In another aspect, the siloxane units are of formula (12)

(12)

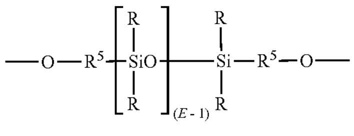

wherein R and E are as described for formula (9), and each $R^5$ is independently a divalent $C_{1-30}$ hydrocarbylene group, and wherein the polymerized polysiloxane unit is the reaction residue of its corresponding dihydroxy compound. In a specific aspect, the polydiorganosiloxane blocks are of formula (13):

(13)

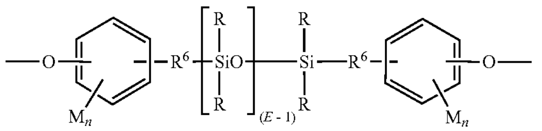

wherein R and E are as defined for formula (10). $R^6$ in formula (13) is a divalent $C_{2-8}$ aliphatic group. Each M in formula (13) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ arylalkylene, $C_{7-12}$ arylalkylenoxy, $C_{7-12}$ alkylarylene, or $C_{7-12}$ alkylaryleneoxy, wherein each n is independently 0, 1, 2, 3, or 4.

In an aspect in formula (13), M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl.

In another aspect in formula (13), R is methyl, or a combination of methyl and trifluoropropyl, or a combination of methyl and phenyl. In still another aspect in formula (13), R is methyl, M is methoxy, n is one, and $R^6$ is a divalent $C_{1-3}$ aliphatic group. Preferred polydiorganosiloxane blocks are of the formulas (13a)

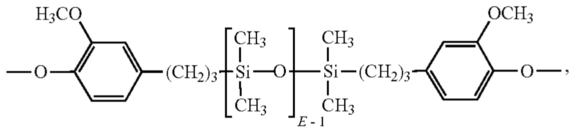

(13b)

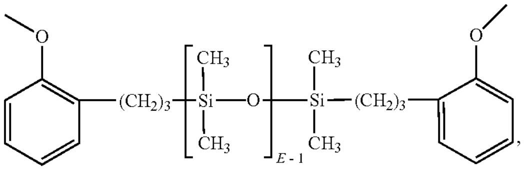

(13c)

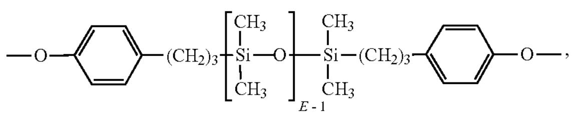

or a combination thereof, wherein E has an average value of 10 to 100, preferably 20 to 60, more preferably 30 to 50, or 40 to 50.

In an aspect, the polycarbonate-siloxane copolymer includes carbonate units derived from bisphenol A, and repeating siloxane units (13a), (13b), (13c), or a combination thereof wherein E has an average value of 10 to 100, or 20 to 60, or 30 to 60, or 40 to 60. In an aspect, the polycarbonate-siloxane copolymer includes carbonate units derived from bisphenol A and repeating siloxane units of formula (13a) (13b), or (13c), wherein E has an average value of 10 to 100, or 20 to 60, or 30 to 50, or 40 to 50.

The polycarbonate-siloxane copolymer can have a siloxane content of from about 5 wt % to about 45 wt % based on the total weight of the polycarbonate-siloxane copolymer. In particular the polycarbonate-siloxane copolymer may have a siloxane content of about 20 wt %, or in sone aspects about 40 wt %. An exemplary polycarbonate-siloxane (PC-Si) copolymer is LEXAN™ EXL resin, available from SABIC, which is an opaque PC-siloxane copolymer having a siloxane content of 20 wt %. As used herein, "siloxane content" of the polycarbonate-siloxane copolymer means the content of siloxane units based on the total weight of the polycarbonate-siloxane copolymer.

In certain aspects the PC-Si copolymer is added to the composition to achieve a total siloxane content in the composition of from about 1 wt % to about 8 wt %.

In particular aspects the composition includes from about 30 wt % to about 80 wt % of the aliphatic polyester-polycarbonate copolymer and from about 5 wt % to about 65 wt % of the polycarbonate-siloxane copolymer, and the composition has a total siloxane content of from about 1 wt % to about 8 wt %. In further aspects the composition includes from about 30 wt % to about 65 wt % of the aliphatic polyester-polycarbonate copolymer, from about 5 wt % to about 50 wt % of the polycarbonate-siloxane copolymer, and from about 20 wt % to about 30 wt % of the IDP, and the composition has a total siloxane content of from about 1 wt % to about 8 wt %.

In certain aspects the composition further includes at least one additional thermoplastic polymer. The additional thermoplastic copolymer may include, but is not limited to, acrylonitrile butadiene styrene (ABS), polylactic acid (PLA), polyethylene terephthalate (PET), polybutylene terephthalate (PBT), acrylonitrile styrene acrylate (ASA), poly (1,4-cyclohexylenedimethylene 1,4-cyclohexanedicarboxylate) (PCCD), or a combination thereof.

The composition may further include at least one additional additive, including but not limited to a filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof. The at least one additional additive may be included in the thermoplastic composition in any amount that will not significantly adversely affect the desired properties of the composition.

Properties of Thermoplastic Compositions

Compositions, according to aspects of the disclosure have improved properties as compared to conventional compositions. Including the IDP in the composition has a desirable effect of increasing surface resistivity, but it also has a detrimental effect on various properties of the composition including visual surface (e.g., gloss), ageing and heat distortion properties. Compositions according to aspects of the disclosure include other components to mitigate the detrimental effect of adding the IDP to the composition.

Accordingly, in some aspects the composition has a surface resistivity, as determined according to ASTM D257, of from about $10^7$ to about $10^{12}$ ohms, or equivalently, ohms per square (Ω/sq).

In further aspects the composition has improved surface gloss properties as compared to a comparative composition that does not include the polyester-polycarbonate copolymer of element (a). Gloss may be determined by according to ASTM D523 from a factory calibration certificate offered by BYK-Gardner ISO/IEC 17025, and may be measured at various angles including but not limited to 20, 60° and 85°.

In specific aspects the composition has a heat distortion temperature of at least 90° C., or at least 95° C., or at least 100° C., or from 90-150° C., or from 90-140° C., or from 90-130° C., or from 90-120° C., or from 95-150° C., or from 95-140° C., or from 95-130° C., or from 95-120° C., or from 100-150° C., or from 100-140° C., or from 100-130° C., or from 100-120° C., as determined in accordance with ISO 75 at 1.8 megapascals (MPa) and 4.0 millimeters (mm).

In certain aspects the composition has a notched Izod impact strength at 23° C. (room temperature) of at least 25 $kJ/m^2$ as tested in accordance with ISO 180 at a thickness of 4.0 mm. In further aspects the composition has a notched Izod impact strength at 23° C. of at least at least 30 $kJ/m^2$, at least at least 35 $kJ/m^2$, at least at least 40 $kJ/m^2$, at least at least 45 $kJ/m^2$, at least 50 $kJ/m^2$, from 25-100 $kJ/m^2$, from 25-80 $kJ/m^2$, from 30-100 $kJ/m^2$, from 30-80 $kJ/m^2$, from 35-100 $kJ/m^2$, from 35-80 $kJ/m^2$, from 40-100 $kJ/m^2$, from 40-80 $kJ/m^2$, from 45-100 $kJ/m^2$, from 45-80 $kJ/m^2$, from 50-100 $kJ/m^2$, or from 50-80 $kJ/m^2$, as tested in accordance with ISO 180 at a thickness of 4.0 mm.

In a particular aspect the composition includes at least 10 wt % of a polycarbonate-siloxane copolymer that is different from the polycarbonate component in element (b) above, wherein the composition has a notched Izod impact strength at −30° C. of at least 30 kilojoules per square meter ($kJ/m^2$), or in specific aspects at least 35 $kJ/m^2$, or at least 40 $kJ/m^2$, or at least 45 $kJ/m^2$, or at least 50 $kJ/m^2$, or from 30-80 $kJ/m^2$, or from 30-75 $kJ/m^2$, or from 30-70 $kJ/m^2$, or from 35-80 $kJ/m^2$, or from 35-75 $kJ/m^2$, or from 35-70 $kJ/m^2$, or from 40-80 $kJ/m^2$, or from 40-75 $kJ/m^2$, or from 40-70 $kJ/m^2$, or from 45-80 $kJ/m^2$, or from 45-75 $kJ/m^2$, or from 45-70 $kJ/m^2$, or from 50-80 $kJ/m^2$, or from 50-75 $kJ/m^2$, or from 50-70 $kJ/m^2$, as tested in accordance with ISO 180 on a molded bar having a 4.0 mm thickness.

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming to form the articles. In a particular aspect the article may be incorporated into alighting application. Specific lighting applications include, but are not limited to, fixtures, housings, enclosures, switches, and flashlights. In other aspects the article may include an enclosure, helmet, handheld device, telephone, walkie-talkie, cable box, camera, car part, weighing device, IoT device, plastic tool, fork-lift truck, power supply box, transport belt, drill, remote control, suction arm, vacuum cleaner, ventilator, pump, or crane.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:

a. from about 5 wt % to about 90 wt % of an aliphatic polyester-polycarbonate copolymer,
b. from about 5 wt % to about 65 wt % of a polycarbonate component different from the aliphatic polyester-polycarbonate copolymer in element (a); and
c. from greater than 5 wt % to about 30 wt % of an inherently dissipative polymer (IDP), wherein the composition has a heat distortion temperature of at least 90° C. at 1.8 megapascals (MPa) and 4.0 millimeters (mm) as determined in accordance with ISO 75, wherein the composition has a notched Izod impact strength at 23° C. of at least 25 kilojoules per square meter ($kJ/m^2$) as tested in accordance with ISO 180 at a thickness of 4.0 mm, and wherein the combined weight percent value of all components does not exceed 100 wt. %, and all weight percent values are based on the total weight of the composition.

Aspect 2. The thermoplastic composition according to Aspect 1, wherein the aliphatic polyester-polycarbonate copolymer comprises a high flow ductile polycarbonate copolymer having a sebacic acid content of from about 4 wt % to about 10 wt % and a molecular weight of from about 17,000 to 40,000.

Aspect 3. The thermoplastic composition according to Aspect 1 or 2, wherein the IDP comprises a polyetheresteramide (PEEA) or a polyether block polymer/styrene copolymer blend.

Aspect 4. The thermoplastic composition according to any of Aspects 1 to 3, wherein the composition further comprises a polycarbonate-siloxane copolymer that is different from the polycarbonate component in element (b).

Aspect 5. The thermoplastic composition according to Aspect 4, wherein the polycarbonate-siloxane copolymer has a siloxane content of from about 5 wt % to about 45 wt % and is added to the composition to achieve a total siloxane content in the composition of from about 1 wt % to about 8 wt %.

Aspect 6. The thermoplastic composition according to Aspect 4 or 5, wherein the composition comprises from about 30 wt % to about 80 wt % of the aliphatic polyester-polycarbonate copolymer and from about 5 wt % to about 65 wt % of the polycarbonate-siloxane copolymer.

Aspect 7. The thermoplastic composition according to any of Aspects 4 to 6, wherein the composition comprises from about 30 wt % to about 65 wt % of the aliphatic polyester-polycarbonate copolymer, from about 5 wt % to about 50 wt % of the polycarbonate-siloxane copolymer, and from about 20 wt % to about 30 wt % of the IDP.

Aspect 8. The thermoplastic composition according to any of Aspects 1 to 7, wherein the composition further comprises at least one additional thermoplastic polymer comprising acrylonitrile butadiene styrene (ABS), polylactic acid (PLA), polyethylene terephthalate (PET), polybutylene terephthalate (PBT), acrylonitrile styrene acrylate (ASA), poly(1,4-cyclohexylenedimethylene 1,4-cyclohexanedicarboxylate) (PCCD), or a combination thereof.

Aspect 9. The thermoplastic composition according to any of Aspects 1 to 8, wherein the composition further comprises a high heat copolymer comprising polycarbonate and 3,3-bis(4-hydroxyphenyl)-2-phenylisoindolin-1-one (PPPBP).

Aspect 10. The thermoplastic composition according to any of Aspects 1 to 9, wherein the composition further comprises at least one additional additive, wherein the at least one additional additive comprises a filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof.

Aspect 11. The thermoplastic composition according to any of Aspects 1 to 10, wherein the composition has a surface resistivity of from about $10^7$ to about $10^{12}$ ohms per square (Ω/sq).

Aspect 12. The thermoplastic composition according to any of Aspects 1 to 11, wherein the composition has improved surface gloss properties as tested according to ASTM D523 at 20°, 60 and/or 85° as compared to a comparative composition that does not include the aliphatic polyester-polycarbonate copolymer of element (a).

Aspect 13. The thermoplastic composition according to any of Aspects 1 to 12, wherein the composition comprises at least 10 wt % A of a polycarbonate-siloxane copolymer that is different from the polycarbonate component in element (b), and wherein the composition has a notched Izod impact strength at −30° C. of at least 30 kilojoules per square meter (kJ/m$^2$), or at least 50 kJ/m$^2$, as tested in accordance with ISO 180 at a thickness of 4.0 mm.

Aspect 14. The thermoplastic composition according to any of Aspects 1 to 13, wherein the polycarbonate component in element (b) is a polycarbonate homopolymer, a polycarbonate copolymer, or a combination thereof.

Aspect 15. An article formed from the thermoplastic composition according to any of Aspects 1 to 14.

Aspect 16. The article according to Aspect 15, wherein the article is a component of a lighting fixture.

Aspect 17. The article according to Aspect 15, wherein the article comprises one or more of: a component of a lighting fixture including a fixture, housing, enclosure, switch, or flashlight an enclosure; helmet; handheld device; telephone; walkie-talkie; cable box; camera; car part; weighing device; IoT device; plastic tool; fork-lift truck; power supply box; transport belt; drill; remote control; suction arm; vacuum cleaner; ventilator; pump; or crane.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The material used in the compositions described herein are listed in Table 1 below:

TABLE 1

Materials Used

| Component | Description | Source |
|---|---|---|
| IDP | Inherently dissipative polymer (anti-stat), hSTAT2 | CRODA |
| HFD | Sebacic acid-bisphenol A copolymer, 5.7 mol % sebacic acid, p-cumylphenol endcap, MFR = 45 g/10 min based on ASTM D1238, Mw = 20,000 to 22,000 as determined via GPC using polystyrene standards and calculated for polycarbonate | SABIC |
| PC | Branched Bisphenol A polycarbonate, produced via interfacial SABIC polymerization, 0.3 mol % 1,1,1-tris(4-hydroxyphenyl)ethane (THPE) branching agent, Mw about 33,600 g/mol as determined by GPC using polycarbonate standards, para-cumylphenol (PCP) end-capped | SABIC |

TABLE 1-continued

| Materials Used | | |
|---|---|---|
| Component | Description | Source |
| EXL | Bisphenol A polycarbonate-polydimethylsiloxane block copolymer having a siloxane content of 20 weight percent, average PDMS block length of 45 units, having a Mw of 29,500 to 30,500 grams per mole as determined by gel permeation chromatography relative to linear bisphenol A polycarbonate standards, produced by interfacial polymerization and endcapped with p-cumylphenol | SABIC |
| Other | Conventional additives including release agent and stabilizers | Various |

The formed compositions were tested for various properties according to the following:

Density—ISO1183

HDT—ISO 75 at 1.8 megapascals (MPa) and 0.45 MPa, flat-wise

Notched Izod impact—ISO 180 at 23° C. and −30° C. and a thickness of 4.0

Tensile modulus—ISO 527, modulus 1 millimeter per minute (mm/min), 50 mm/min at 23° C.

MVR—ISO 1133, 250 Sc, 5 kilogram (kg) load, dwell time of 300 and 720 seconds.

Surface resistivity (SR)—ASTM D257

Gloss—factory calibration certificate offered by BYK-Gardner ISO/IEC 17025 tested in accordance with ASTM D523 at angles of 20% 60' and 85°.

Thermoplastic compositions were formed according to Tables 2A and 2B. The properties of the compositions are provided in Tables 3A and 3B.

TABLE 2A

| Compositions C1.1-C1.7 | | | | | | | |
|---|---|---|---|---|---|---|---|
| | C1.1 | C1.2 | C1.3 | C1.4 | C1.5 | C1.6 | C1.7 |
| Component (wt %) | | | | | | | |
| IDP | 21 | 19 | 14 | 19 | 19 | 24 | 24 |
| HFD | 30.45 | 54.7 | 8.2 | 31.45 | 8.2 | 28.95 | 49.7 |
| PC | 30.45 | 8.2 | 59.7 | 31.45 | 54.7 | 28.95 | 8.2 |
| EXL | 17.5 | 17.5 | 17.5 | 17.5 | 17.5 | 17.5 | 17.5 |
| Other | 0.6 | 0.6 | 0.6 | 0.6 | 0.6 | 0.6 | 0.6 |
| Properties | | | | | | | |
| Density | 1.2 | 1.2 | 1.2 | 1.2 | 1.2 | 1.2 | 1.2 |
| HDT (1.8 MPa) (° C.) | 107.0 | 105.2 | 113.8 | 108.4 | 110.4 | 105.9 | 102.0 |
| HDT (-.45 MPa) (° C.) | 123.0 | 120.3 | 129.2 | 124.0 | 127.0 | 121.9 | 117.9 |
| NII (RT) ($kJ/m^2$) | 56.6 | 55.1 | 67.2 | 58.2 | 59.2 | 56.0 | 51.5 |
| NII (−30° C.) (kJ/m2) | 55.7 | 51.8 | 59.1 | 58.0 | 54.4 | 53.4 | 47.2 |
| Tensile Modulus (MPa) | 1656 | 1684 | 1862 | 1710 | 1752 | 1583 | 1529 |
| MVR (std) ($cm^3$/10 min) | 12.9 | 25.8 | 4.9 | 12.3 | 6.0 | 13.6 | 24.1 |
| MVR (abu) (cm3/10 min) | 15.8 | 27.9 | 5.5 | 13.0 | 6.5 | 13.9 | 29.9 |
| Visual inspection | Poor | Good | Poor | Good | Poor | Poor | Good |
| SR (ohm/sq) | 1.13E+10 | 2.30E+10 | 1.77E+10 | 1.60E+10 | 1.53E+10 | 1.17E+10 | 1.10E+10 |

TABLE 2B

| Compositions C1.8-C1.14 | | | | | | | |
|---|---|---|---|---|---|---|---|
| | C1.8 | C1.9 | C1.10 | C1.11 | C1.12 | C1.13 | C1.14 |
| Component (wt %) | | | | | | | |
| IDP | 24 | 14 | 14 | 19 | 19 | 19 | 21 |
| HFD | 8.2 | 59.7 | 33.95 | 34.45 | 65.1 | 9.8 | 0 |
| PC | 49.7 | 8.2 | 33.95 | 34.45 | 9.8 | 65.1 | 78.4 |
| EXL | 17.5 | 17.5 | 17.5 | 11.5 | 5.5 | 5.5 | 0 |
| Other | 0.6 | 0.6 | 0.6 | 0.6 | 0.6 | 0.6 | 0.6 |
| Properties | | | | | | | |
| Density | 1.2 | 1.2 | 1.2 | 1.2 | 1.2 | 1.2 | 1.2 |
| HDT (1.8 MPa) (° C.) | 104.5 | 108.8 | 110.9 | 108.8 | 105.2 | 111.7 | 114.1 |

TABLE 2B-continued

| Compositions C1.8-C1.14 | | | | | | | |
|---|---|---|---|---|---|---|---|
| | C1.8 | C1.9 | C1.10 | C1.11 | C1.12 | C1.13 | C1.14 |
| HDT (-.45 MPa) (° C.) | 122.5 | 122.7 | 126.3 | 124.1 | 119.4 | 127.7 | 130.1 |
| NII (RT) (kJ/$m^2$) | 55.1 | 59.7 | 73.6 | 58.8 | 53.8 | 59.0 | 55.9 |
| NII (−30° C.) (kJ/m2) | 52.4 | 55.6 | 62.9 | 50.0 | 29.0 | 31.9 | 26.0 |
| Tensile Modulus (MPa) | 1628 | 1831 | 1859 | 1757 | 1754 | 1838 | 1865 |
| MVR (std) ($cm^3$/10 min) | 7.6 | 24.5 | 11.0 | 12.7 | 31.1 | 6.1 | 4.7 |
| MVR (abu) (cm3/10 min) | 7.6 | 25.3 | 12.4 | 14.1 | 32.4 | 5.7 | 4.7 |
| Visual inspection | Poor | Good | Poor | Good | Good | Poor | Poor |
| SR (ohm/sq) | 1.37E+10 | 2.07E+10 | 2.33E+10 | 2.30E+10 | 3.27E+10 | 2.53E+10 | 1.63E+10 |

Several observations may be made from the data. Compositions C1.10 and C1.11 demonstrate that increasing the amount of PC-Si copolymer (EXL) at the expense of anti-static agent loading (IDP) results in a sample having a poor surface finish (visual observation). Compositions C1.2, C1.4 and C1.5 show that increasing the amount of high flow PC copolymer (FD) at the expense of PC results in an improved surface finish, while keeping the other components the same. In contrast using only polycarbonate (C1.14) results in a poor surface finish. Composition C1.1 included the high flow PC copolymer and PC-Si copolymer and had a poor surface finish, whereas Composition C1.4 having a lowered IDP content had a good surface finish. Compositions C1.10 through C1.14 show a decreasing low temperature NII (−30° C.) with decreasing PC-Si loading. From the data it was thus observed that by including ahigh flow PC copolymer with higher amounts of PC-Si copolymer, the negative effects of the PC-Si copolymer on surface finish can be offset, resulting in a composition having good visual properties.

Visual properties may be quantified by evaluating the gloss of the samples, in conjunction with the qualitative visual inspection as mentioned before. Gloss data for the compositions is set forth in Tables 3A and 3B:

TABLE 3A

| Gloss Properties of C1.1-C1.7 | | | | | | | |
|---|---|---|---|---|---|---|---|
| Gloss (viewing angle, degrees) | C1.1 | C1.2 | C1.3 | C1.4 | C1.5 | C1.6 | C1.7 |
| 20° | 12.6 | 16.2 | 9.2 | 11.1 | 7.9 | 7.5 | 14.9 |
| 60° | 46.8 | 54.8 | 38.2 | 41.6 | 31.4 | 29.9 | 51.4 |
| 85° | 89.1 | 92.3 | 78.7 | 86.7 | 76.8 | 80.1 | 90.6 |

TABLE 3B

| Gloss Properties of C1.8-C1.14 | | | | | | | |
|---|---|---|---|---|---|---|---|
| Gloss (viewing angle, degrees) | C1.8 | C1.9 | C1.10 | C1.11 | C1.12 | C1.13 | C1.14 |
| 20° | 4.8 | 29.5 | 51.7 | 12.3 | 39.3 | 6.7 | 5.0 |
| 60° | 19.4 | 73.7 | 87.0 | 45.7 | 79.9 | 28.4 | 20.9 |
| 85° | 66.3 | 96.0 | 97.5 | 88.5 | 96.5 | 73.8 | 66.9 |

As shown, compositions C1.1, C1.4, C1.6 and C1.10 increasing the IDP content decreases the sample's gloss. Further, composition C1.2 with 19 wt % IDP, 17.5 wt % EXL, a relatively low PC and high HFD content had relatively poor gloss compared to C1.12 with the same IDP content, 5.5 wt % EXL and also a relatively low PC and high HFD content. From these examples it is concluded that the high PC-Si copolymer (EXL) content results in lower gloss properties.

In addition, composition C1.13 had the same IDP and EXL content as C1.12 but the HFD and PC content of the compositions was reversed, with C1.13 having a low HFD content and a high PC content. The gloss of C1.13 is substantially lower than that of C1.12. From this data it is concluded that the use of HFD improves gloss properties of the disclosed compositions.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A thermoplastic composition comprising:

a. from about 30 wt % to about 65 wt % of a high flow ductile polycarbonate copolymer having a sebacic acid content of from about 4 wt % to about 10 wt % and a molecular weight from about 17,000 to 40,000;

b. from about 5 wt % to about 60 wt % of a polycarbonate homopolymer;

c. from greater than 5 wt % to about 30 wt % of a polyether block polymer/styrene copolymer blend; and d. from about 5 wt % to about 50 wt % of a polycarbonate-siloxane copolymer having a siloxane content of from about 5 wt % to about 45 wt % added to the composition to achieve a total siloxane content in the composition of from about 1 wt % to about 8 wt %, wherein the composition has a surface resistivity of from about $10^7$ to about $10^{12}$ ohms per square (Ω/sp) as determined according to ASTM D257, wherein the composition has a heat distortion temperature of at least 90° C. at 1.8 megapascals (MPa) and 4.0 millimeters (mm) as determined in accordance with ISO 75, wherein the composition has a notched Izod impact strength at 23° C. of at least 25 kilojoules per square meter ($kJ/m^2$) as tested in accordance with ISO 180 at a thickness of 4.0 mm, wherein the composition has improved surface gloss properties as tested in accordance with ASTM D523 as compared to a comparative composition that does not include the aliphatic polyester-polycarbonate copolymer of element (a), and wherein the combined weight percent value of all components does not exceed 100 wt. %, and all weight percent values are based on the total weight of the composition.

2. The thermoplastic composition according to claim 1, wherein the polycarbonate-siloxane copolymer has a siloxane content of about 20 wt %.

3. The thermoplastic composition according to claim 1, wherein the composition further comprises at least one additional thermoplastic polymer comprising acrylonitrile butadiene styrene (ABS), polylactic acid (PLA), polyethylene terephthalate (PET), polybutylene terephthalate (PBT), acrylonitrile styrene acrylate (ASA), poly(1,4-cyclohexylenedimethylene 1,4-cyclohexanedicarboxylate) (PCCD), or a combination thereof.

4. The thermoplastic composition according to claim 1, wherein the composition further comprises a high heat copolymer comprising polycarbonate and 3,3-bis(4-hydroxyphenyl)-2-phenylisoindolin-1-one (PPPBP).

5. The thermoplastic composition according to claim 1, wherein the composition further comprises at least one additional additive, wherein the at least one additional additive is selected from the group consisting of a filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof.

6. The thermoplastic composition according to claim 1, wherein the composition has a notched Izod impact strength at −30° C. of at least 30 $kJ/m^2$ as tested in accordance with ISO 180 at a thickness of 4.0 mm.

7. An article formed from the thermoplastic composition according to claim 1, wherein the article is selected from the group consisting of: a component of a lighting fixture including a fixture, housing, enclosure, switch, or flashlight; an enclosure; helmet; handheld device; telephone; walkie-talkie; cable box; camera; car part; weighing device; IoT device; plastic tool; fork-lift truck; power supply box; transport belt; drill; remote control; suction arm; vacuum cleaner; ventilator; pump; and a crane.

* * * * *